United States Patent
Hsu

(10) Patent No.: US 9,135,527 B2
(45) Date of Patent: Sep. 15, 2015

(54) EJECTING DEVICE FOR STORAGE CARD

(71) Applicant: HON HAI PRECISION INDUSTRY CO., LTD., New Taipei (TW)

(72) Inventor: Chih-Hua Hsu, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 92 days.

(21) Appl. No.: 14/014,417

(22) Filed: Aug. 30, 2013

(65) Prior Publication Data

US 2014/0179135 A1    Jun. 26, 2014

(30) Foreign Application Priority Data

Dec. 25, 2012  (CN) .......................... 2012 1 0568996

(51) Int. Cl.
  *G06K 13/08*  (2006.01)
(52) U.S. Cl.
  CPC .................................. *G06K 13/0806* (2013.01)
(58) Field of Classification Search
  CPC ............... H01R 13/635; H01R 13/633; H01R 12/7005; H01R 13/6335; H01R 13/629; H01R 12/7047; H01R 13/6582; H01R 13/6592; H01R 13/6595; H01R 13/7031; H01R 12/7094; H01R 12/714; H01R 13/24; H01R 13/44; H01R 13/4532; H01R 13/533
  USPC .................................. 439/152, 155, 159, 160
  See application file for complete search history.

(56) References Cited

U.S. PATENT DOCUMENTS

| | | | | |
|---|---|---|---|---|
| 6,319,028 B1* | 11/2001 | Zhang et al. | ................... | 439/159 |
| 7,980,868 B2* | 7/2011 | Chou et al. | ..................... | 439/131 |
| 8,070,500 B2* | 12/2011 | Li | ................ | 439/159 |
| 2011/0076883 A1* | 3/2011 | Jol | ................. | 439/521 |

FOREIGN PATENT DOCUMENTS

| | | |
|---|---|---|
| TW | 468872 U | 12/2001 |
| TW | 201112725 A1 | 4/2011 |
| TW | 201120615 A1 | 6/2011 |

* cited by examiner

*Primary Examiner* — Abdullah Riyami
*Assistant Examiner* — Nelson R Burgos-Guntin
(74) *Attorney, Agent, or Firm* — Novak Druce Connolly Bove + Quigg LLP

(57) ABSTRACT

An ejecting device includes a housing for allowing insertion of a storage card, an engaging member, a processor, a ejecting member, an electromagnet, a switch button, and an spring member. The ejecting member is received and movable in the housing. The engaging member is configured to engage in the ejecting member or disengage from the ejecting member. The switch button is configured to generate an ejection signal. The processor is configured to execute a program to save data in the storage card in response to the ejection signal and control the electromagnet to pull the engaging member out of the ejecting member after the execution of the program is finished. The spring member is configured to push the ejecting member and the storage card out of the housing.

6 Claims, 3 Drawing Sheets

EJECTING DEVICE FOR STORAGE CARD

BACKGROUND

1. Technical Field

The present disclosure relates to ejecting devices, and especially to an ejecting device employed in an electronic device for receiving and ejecting, for example, a storage card.

2. Description of Related Art

Electronic devices, such as mobile phones, electronic readers, and computers, include a space to plug in a storage card. When a user wants to take out the storage card, a program is executed to save data in the storage card. However, the program must be started by the user. If the user forgets to start the program before taking out the storage card, the data in the storage card may be lost.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

Figure 1:
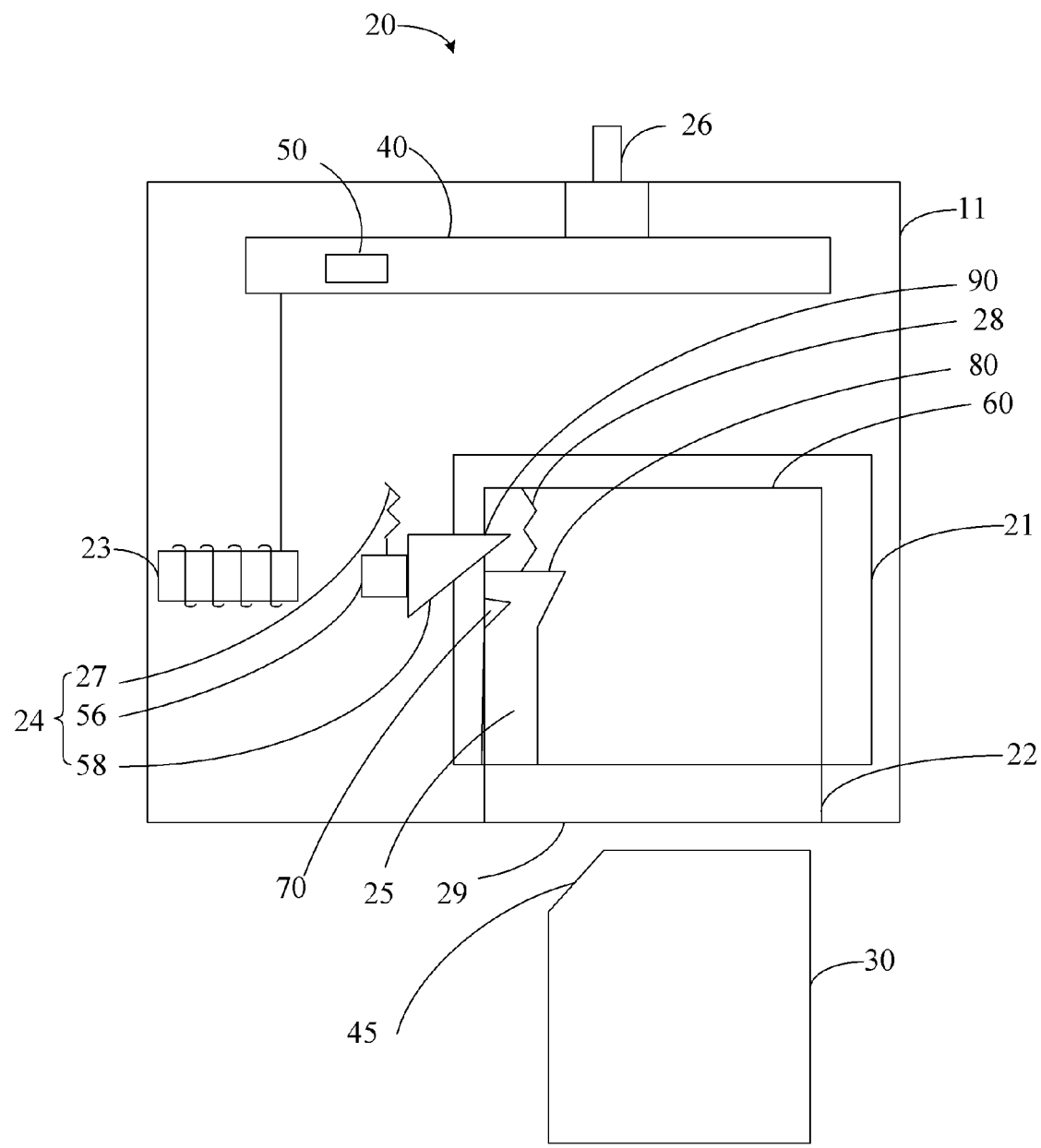
FIG. 1 is a schematic view of an ejecting device without a storage card received.
Figure 2:
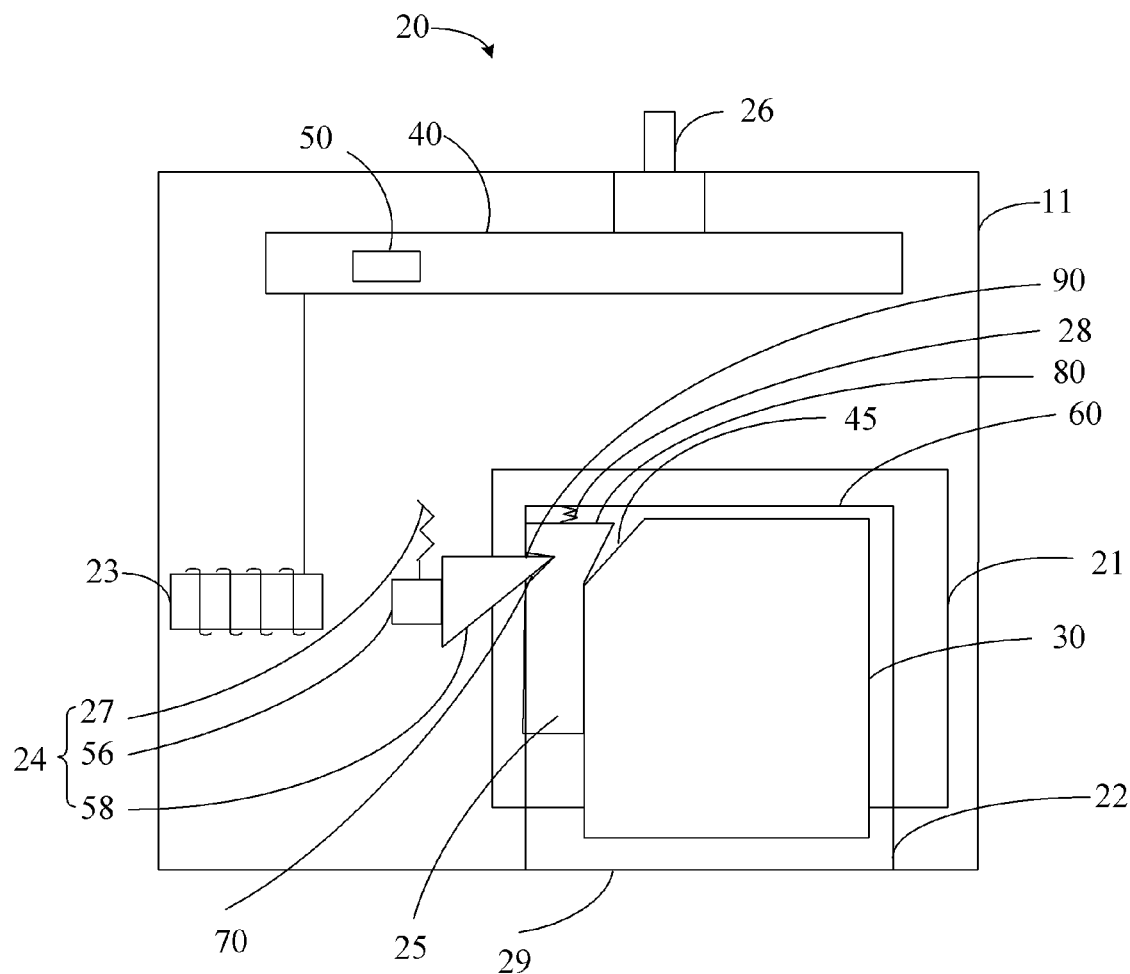
FIG. 2 is a schematic view of the ejecting device with the storages card, and an engaging member engaging in a socket member.
Figure 3:
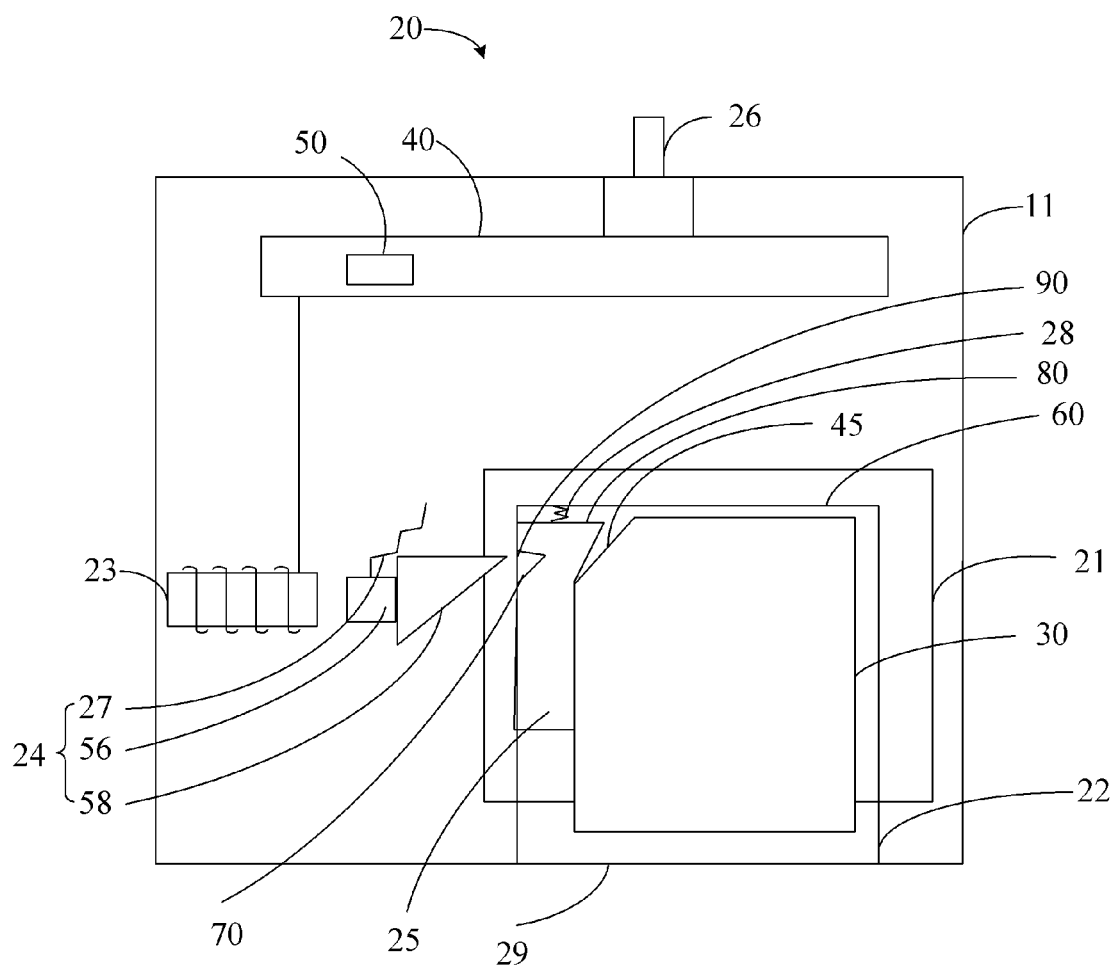
FIG. 3 is a schematic view of the ejecting device with the storages card, and the engaging member being disengaged from the socket member.

Referring to FIGS. 1-3, an ejecting device 20, according to an exemplary embodiment, is employed in a body 11 of an electronic device for receiving and extracting a storage card 30. The ejecting device 20 includes a first housing 21 fixed to the body 11, a second housing 22 fixed in the first housing 21 and defining an opening for allowing insertion of the storage card 30 thereinto, a electromagnet 23 fixed in the body 11, a ejecting member 25, an engaging member 24 fixed in the body 11, a switch button 26, a first spring member 28, a second spring member 27, a circuit board 40, and a processor 50 mounted on the circuit board 40.

The engaging member 24 is substantially perpendicular to the ejecting member 25 and movable between the electromagnet 23 and the ejecting member 25. The engaging member 24 is configured to engage in or disengage from the ejecting member 25. The engaging member 24 includes a wedge 58, a connecting member 56. One end of the second spring member 27 is connected to the body 11, while the other end of the second spring member 27 is connected to the connecting member 56. The connecting member 56 protrudes from the wedge 58 and is opposite to the electromagnet 23. The connecting member 56 is made of magnetic material to be attracted by the electromagnet 23.

One end of the first spring member 28 is connected to the ejecting member 25, while the other end of the first spring member 28 is connected to an inner wall 60 of the second housing 22. The ejecting member 25 is received in the second housing 22 and defines a groove 70 adjacent to the engaging member 24. The ejecting member 25 includes a protrusion 80 far away from the engaging member 24. The second housing 22 defines an opening 90 facing the wedge 58. The storage card 30 includes a cutout portion 45. Before the storage card 30 plugs in the second housing 22, an end of the wedge 58 is positioned above the ejecting member 25 and received in the opening. When the storage card 30 is plugged into the second housing 22 and is pushed to the protrusion 80, the cutout portion 45 of the storage card 30 drives the ejecting member 25 to move toward the inner wall 60. The ejecting member 25 is configured to drive the wedge 58 out of the opening 90 when the ejecting member 25 is driven to connect to the end of the wedge 58 received in the opening 90. The second spring member 27 is configured to push the end of the wedge 58 back to extend through the opening 90 and engage in the groove 70 when the ejecting member 25 moves to the point where the groove 70 is aligned with the wedge 58. When the end of the wedge 58 is received in the groove 70, the storage card 30 is positioned at a preset position to be read.

The switch button 26 partly extends out of the body 11. The switch button 26 is electronically connected to the circuit board 40 and configured to generate an ejection signal when the storage card 30 is being ejected in response to a user's operation thereupon.

The processor 50 is configured to execute a program to save data in the storage card 30 in response to the ejection signal. The processor 50 is further configured to control the electromagnet 23 to pull the engaging member 24 out of the ejecting member 25 during a preset period time after the execution of the program is finished. Specifically, the processor 50 controls electric current to flow to the electromagnet 23 during the preset period time after the execution of the program is finished. The electromagnet 23 generates an electromagnetic field in response to the electric current and applies a magnetical attraction force to attract the connecting member 56 to disengage the end of the wedge 58 from the groove 70 in a direction perpendicular to the ejecting member 25.

The first spring member 28 is configured to apply a force on the ejecting member 25 to push the ejecting member 25 to move toward the opening 29 of the second housing 22 during the preset time, thereby the ejecting member 25 ejecting the storage card 30 out of the second housing 22. In the exemplary embodiment, when the first spring member 28 pushes the ejecting member 25 away from the inner wall 60, the protrusion 80 urges the cutout portion 45 to move out of the second housing 22. The second spring member 27 is further configured to push the engaging member 24 back to plug the end of the wedge 58 into the opening 90 when the storage card 30 is ejected from the second housing 22.

The storage card 30 is ejected from the second housing 22 after the execution of the program to save the data in the storage card 30. Thus, the data is successfully stored in the storage card 30 before the storage card 30 is removed.

It is to be understood, however, that even though numerous characteristics and advantages of the present disclosure have been set forth in the foregoing description, together with details of the structure and function of the present disclosure, the present disclosure is illustrative only, and changes may be made in detail, especially in matters of shape, size, and arrangement of parts within the principles of the present disclosure to the full extent indicated by the broad general meaning of the terms in which the appended claims are expressed.

The invention claimed is:

1. An ejecting device employed in a body of an electronic device for receiving and ejecting a storage card, comprising:
   a first housing fixed to the body;

a second housing fixed in the first housing, the second housing defining an opening for allowing insertion of the storage card thereinto;

an ejecting member received in the second housing, the ejecting member movable between a retaining position where the storage card is entirely retained by the ejecting member within the second housing and a releasing position where the storage card is released and ejected out by the ejecting member from the second housing;

a first spring member received in the second housing and configured to apply a force on the ejecting member to push the ejecting member to move from the retaining position toward the opening of the second housing, thereby the ejecting member ejecting the storage card out of the second housing;

an engaging member movable between a first position where the engaging member is inserted into the second housing and a second position where the engaging member exits from the second housing, wherein the engaging member stays in the first position to engage with the ejecting member when the ejecting member is in the retaining position and to disengage from the ejecting member when the ejecting member is in the releasing position;

an electromagnet configured to apply a magnetic attraction force to the engaging member to move the engaging member from the first position to the second position, to allow the ejecting member to move from the retaining position to the releasing position;

a circuit board;

a switch button electronically connected to the circuit board, the switch button configured to generate an ejection signal in response to a user's operation thereupon; and a processor mounted on the circuit board and configured to execute a program to save data in the storage card in response to the ejection signal, the processor further configured to control the electromagnet to pull the engaging member to disengage the ejecting member during a preset period after the execution of the program is finished.

2. The ejecting device as described in claim 1, wherein a moving direction of the engaging member is substantially perpendicular to a moving direction of the ejecting member.

3. The extraction ejecting device as described in claim 1, wherein the ejecting member comprises a protrusion, the protrusion is configured to urge a cutout portion of the storage card to move out of the second housing.

4. The ejecting device as described in claim 2, further comprising a second spring member coupled between the body of the electronic device and the engaging member, the second spring member configured to apply a force onto the engaging member to move the engaging member from the second position to the first position after the magnetic attraction force applied to the engaging member is removed.

5. The ejecting device as described in claim 4, wherein the engaging member comprises a wedge which is able to insert itself into or exit from the second housing, the ejecting member is able to abut against a wedge surface of the wedge to move the engaging member from the first position to the second position when the ejecting member is moved from the releasing position to the retaining position.

6. The ejecting device as described in claim 5, wherein the ejecting member defines a groove facing the wedge, and the groove is configured to engage with the wedge.

* * * * *